Sept. 19, 1967  R. STAMMBACH  3,342,053
METHOD OF PRODUCING RAIL SECTIONS
Filed April 9, 1965  7 Sheets-Sheet 1

Raymond Stammbach
Inventor
By Wenderoth, Lind & Ponack,
Attorneys

Sept. 19, 1967  R. STAMMBACH  3,342,053
METHOD OF PRODUCING RAIL SECTIONS
Filed April 9, 1965  7 Sheets-Sheet 2
Fig. 3
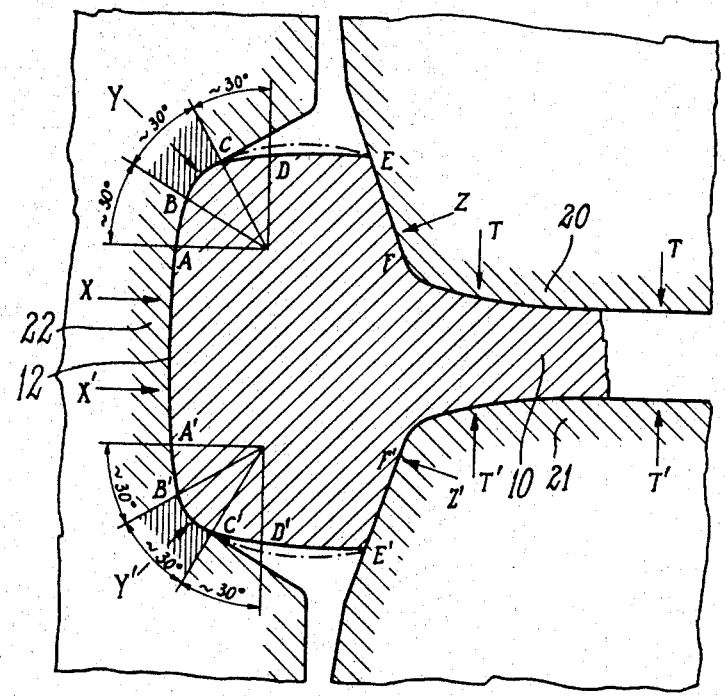
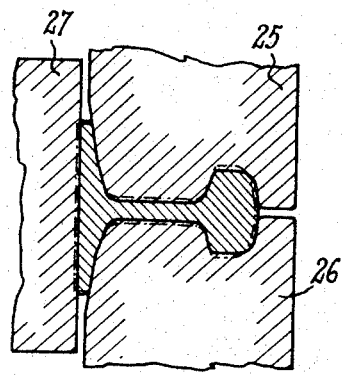
Fig. 13
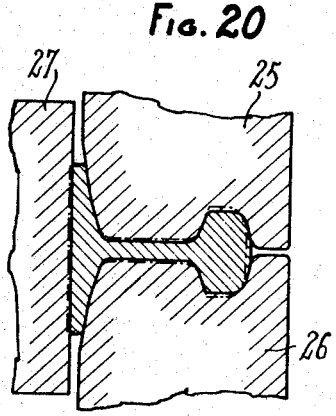
Fig. 20
Raymond Stammbach,
Inventor
By Wenderoth, Lind and Ponack
Attorneys

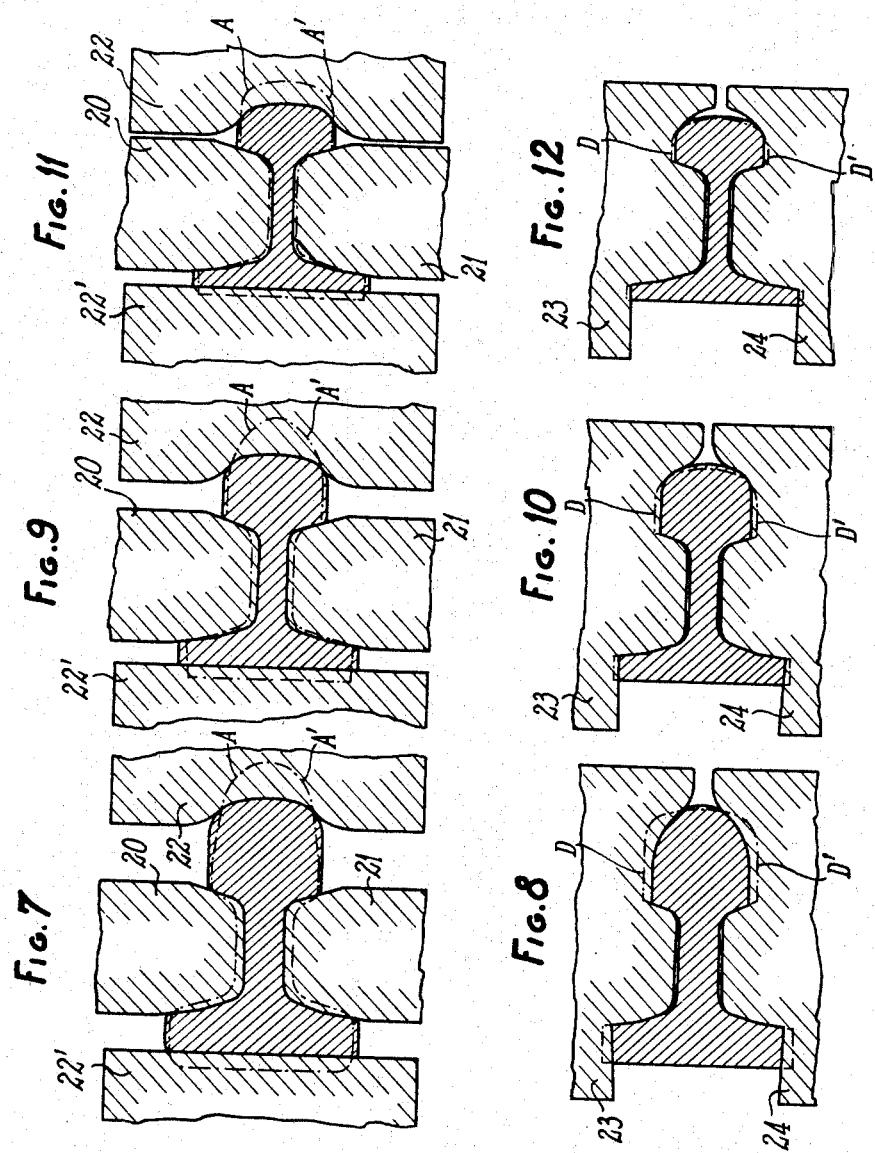

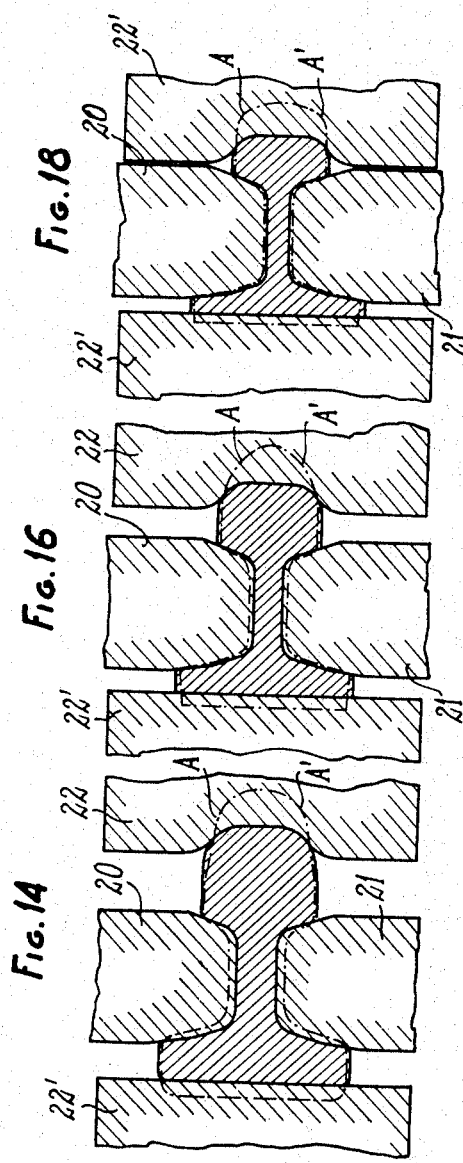
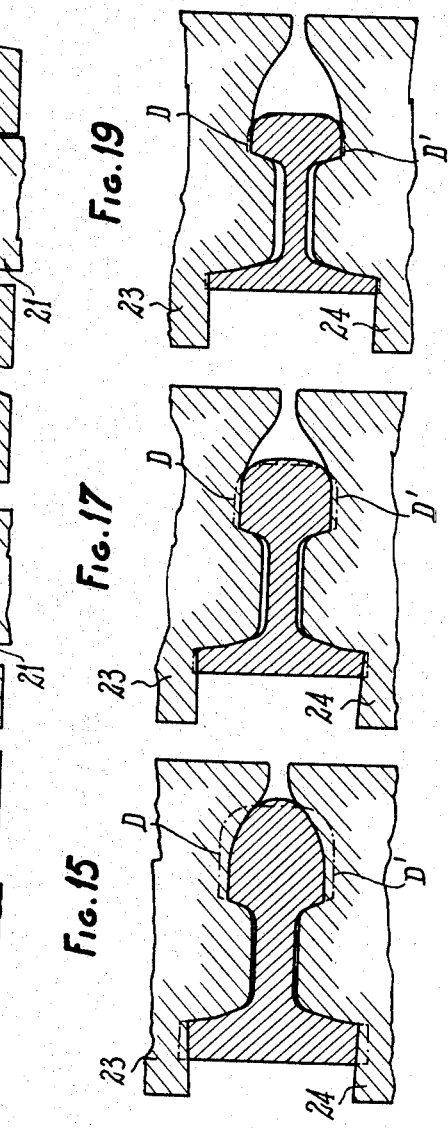

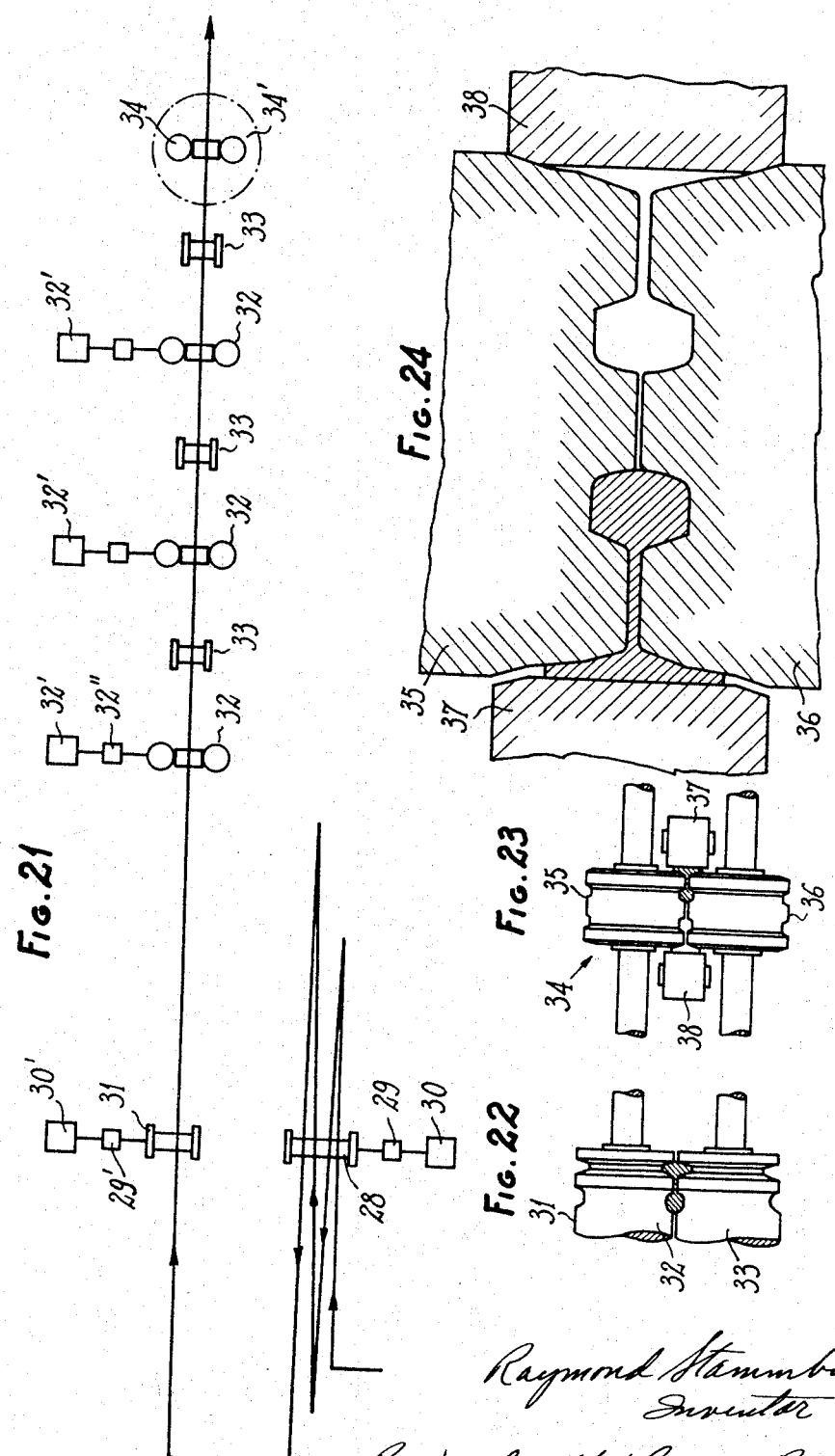

Sept. 19, 1967  R. STAMMBACH  3,342,053
METHOD OF PRODUCING RAIL SECTIONS
Filed April 9, 1965  7 Sheets-Sheet 7
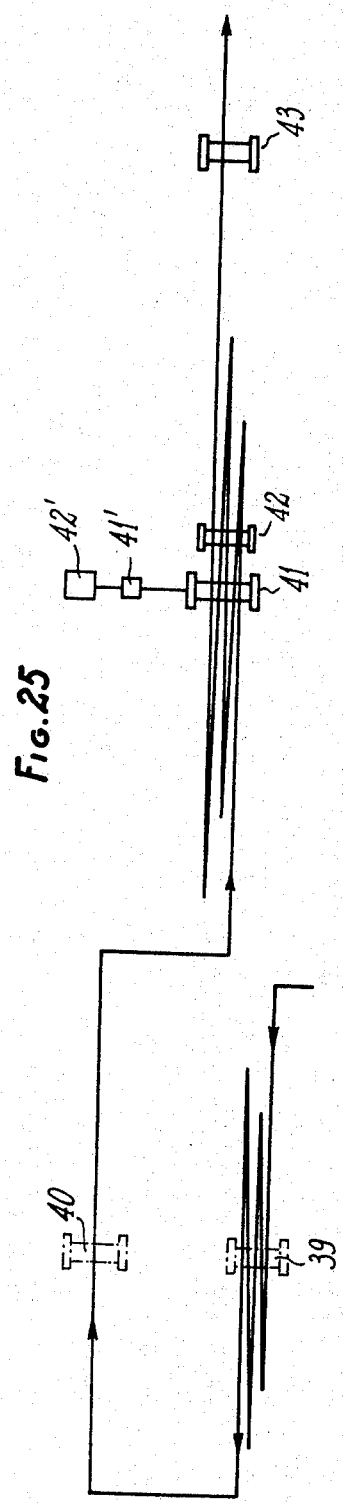
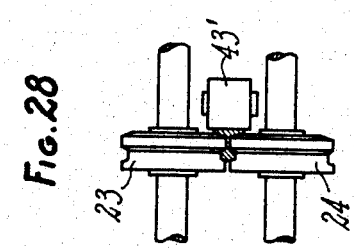
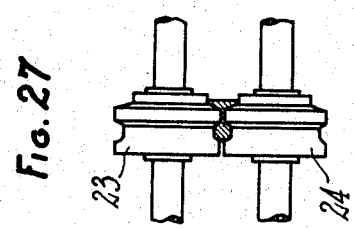
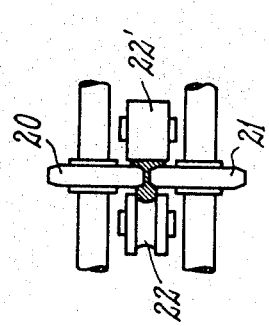

United States Patent Office 3,342,053
Patented Sept. 19, 1967

3,342,053
METHOD OF PRODUCING RAIL SECTIONS
Raymond Stammbach, Seremange, France, assignor to
De Wendel & Cie, Paris, France
Filed Apr. 9, 1965, Ser. No. 446,860
Claims priority, application France, Apr. 15, 1964,
970,951
10 Claims. (Cl. 72—226)

This invention is directed to a novel method of producing rolled rail sections.

Critical investigation of the conventional process by which rail sections are produced including a detailed analysis of the deformations successively undergone by the metal blank during the rolling operations up to the point it has been brought to its final shape and size proves that the conventional rolling process is illogical. Thus, whereas in service on a railroad track the rail is exposed to intense dynamic stress on the upper surface and side edges of the rail head, during the rolling process the corresponding parts of the blank section are subjected almost exclusively to indirect rolling pressure, and are consequently not exposed to directly applied cold-working strains which would be capable of imparting maximum strength thereto.

Furthermore, the conventional shaping process usually involves use of an asymmetrically shaped blank section. Thus, referring to FIG. 1 of the accompanying drawings, the references $a$, $b$, and $c$ respectively designate typical cross sectional contours of a steel billet, initial rail blank and final rail section as occurring in a representative conventional rail rolling process. It will be noted that the rolling blank $b$ is highly asymmetrical, as well as possessing sharp edges and highly deformed projecting portions. Consequently, the metal fibres are subjected during the rolling operations to intense distortion and shear, resulting in a broken, jagged fibrous structure, which generates internal tensions and will tend to promote the propagation and enlargement of cracks and other defects in service.

The asymmetrical profile and sharp edges cause unequal rates of cooling in the blank during rolling, a further cause of strong internal strains in the finished rail.

In the conventional rolling process, the direct and indirect pressures applied to the top and bottom surfaces of the rail section in successive passes are exerted in such directions and in such sequence as to develop and maintain the internal tensions present in the rolled rail section. Such tensions and related defects tend to be aggravated during final straightening and other processing strips.

The presence of high internal strains in rails as heretofore made is a fact that has been known for very many years, and published inter alia by Professor Roos and co-workers at the Federal Laboratory of Zurich (Switzerland) and at the Commission Mixte du Rail Francais (French Joint Rail Board). Cf. Luchini and Roos, "Initial Reports to the New International Material Testing Association" (Zurich 1930), Roos and Eichinger, "Methods of Rail Testing in the Laboratory, Plant and on Rail Tracks," report to International Rail Conference, Zurich 1932, second day; also "Tests and Measurements of Internal Tensions in Rails," December 1935. Notwithstanding these results of many years standing, no significant advance has been made in the art of rail manufacture in recent years, to the best of applicant's knowledge, and rail stock is currently being made by generally the same unscientific procedure as at the time of the above reports. It is evident that the presence of the high internal strains and tensions noted is a source of wear and tear in service and significantly reduces the service life of the tracks.

It has been an object of this invention to provide an improved process of rolling rail sections whereby the above defects will be to a large extent eliminated, and a final rail section produced substantially free from internal tensions as well as distortion and damage to the crystalline structure of the metal, and similar defects. Related objects are to provide improved rail rolling procedure involving the exertion of symmetrical forces to a symmetrically shaped section throughout the shaping process; to provide such a process in which a rail section is subjected to alternating series of rolling passes so performed as to apply pressure forces to different surfaces of the rail section in each of two mutually orthogonal directions while concurrently permitting controlled extrusion of the metal in the other orthogonal direction; and at the same time to maintain a smooth rounded form in the rail head and other parts of the rail section throughout all rolling passes, thereby to avert the occurrence of sharp edges at any time. It is also an object during such a rail rolling process to impart high cold-working forces directly to the upper or tread surface of the rail head and primarily to the side edge portions thereof for maximum strength in these regions which are to be exposed in service to the direct action of the rolling-stock wheel rims and flanges. Other objects involve the provision of rolling plant layouts for carrying out a rail rolling process of the above character with maximum efficiency and economy.

The invention will now be described for purposes of illustration but not of limitation with reference to the accompanying drawings, wherein:

FIG. 1, earlier referred to, is a diagrammatic showing of the cross sectional contour of a billet, rail blank and final rail at three stages of a representative conventional rail making process.

FIG. 2 is an analogous showing relating to the improved process of the invention.

FIGS. 3 and 4 are large-scale partial cross sectional views of a rail blank being subjected, respectively, to each of the two different types of rolling passes used in accordance with the invention, with a diagrammatic indication of the forces applied. It is noted that FIGS. 3 and 4 can be regarded as being enlarged views of the central parts of FIGS. 5 and 6 respectively.

FIGS. 7–13 are fragmentary sectional views depicting successive passes performed during a rolling process according to the invention when embodied as a continuous procedure of the type generally illustrated in FIG. 21.

FIGS. 14–20 are generally similar views but relating to a reversing or repetitive procedure of the type generally illustrated in FIG. 25.

FIG. 21 is a small-scale, diagrammatic plan view of the continuous rolling process referred to above.

FIG. 22 is a partial cross sectional view of a blank-finishing stand as used in the process of FIG. 21.

FIG. 23 is a similar view of a rotatable turret-mounted finishing stand as used in the set-up of FIG. 21.

FIG. 24 is a larger-scale view of part of FIG. 23.

FIG. 25 is a small-scale, diagrammatic plan view of the repetitive rolling process referred to above; and FIGS. 26–28 are partial cross sectional views of three reversible rolling stands usable in the process of FIG. 25.

Figure 1:
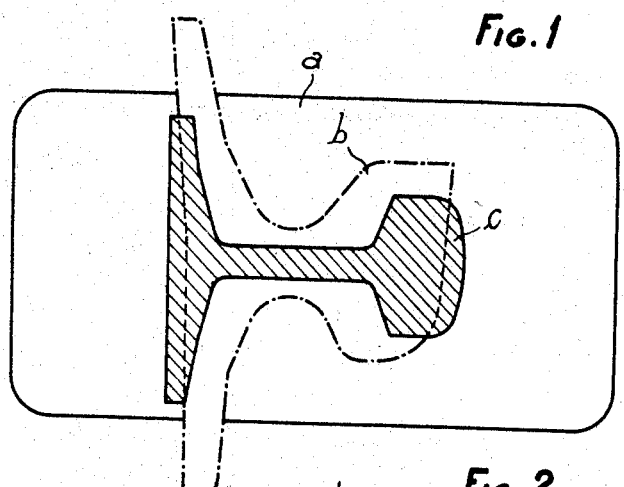
Figure 2:
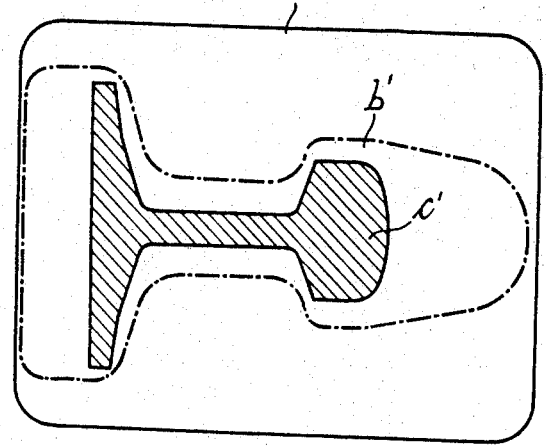

Referring to FIG. 2 and comparing it with FIG. 1, it will be noted that in the process of the invention to be presently described in detail, the rail shaping process starting with rectangular billet $a'$ and ending up with the final rail section $c'$, involves a smooth and continuous reduction in cross section and uses a rolling blank $b'$ which is wholly symmetrical, with rounded surfaces throughout its contour, and without any jutting projections, as contrasted with the asymmetrical blank $b$ with sharp edges and jutting portions, as typically used in the conventional process shown in FIG. 1. These features, taken jointly with the other characteristics of the invention to be described, result in a final rail section which is substantially free from the high internal strains, and broken, ragged fibre structure that are invariably found to occur in conventional rail stock, for the reasons earlier explained herein.

In accordance with the invention, a symmetrically shaped rail section blank, such as the blank indicated at $b'$ (FIG. 2), is subjected to a number of rolling passes, which include a first and a second series alternating as between one another.

In each rolling pass of the first series, see FIG. 3, the section is subjected to a set of symmetrical, converging rolling forces which are applied predominantly to the upper surface of the rail head, as indicated by the arrows $XX'$, as well as to the upper side edge surfaces (as at $YY'$) and to the base surfaces (as at $ZZ'$) of the rail head, while permitting limited expansion of the metal laterally of the rail head as indicated by the dot-dash lines in FIG. 3.

Figure 4:
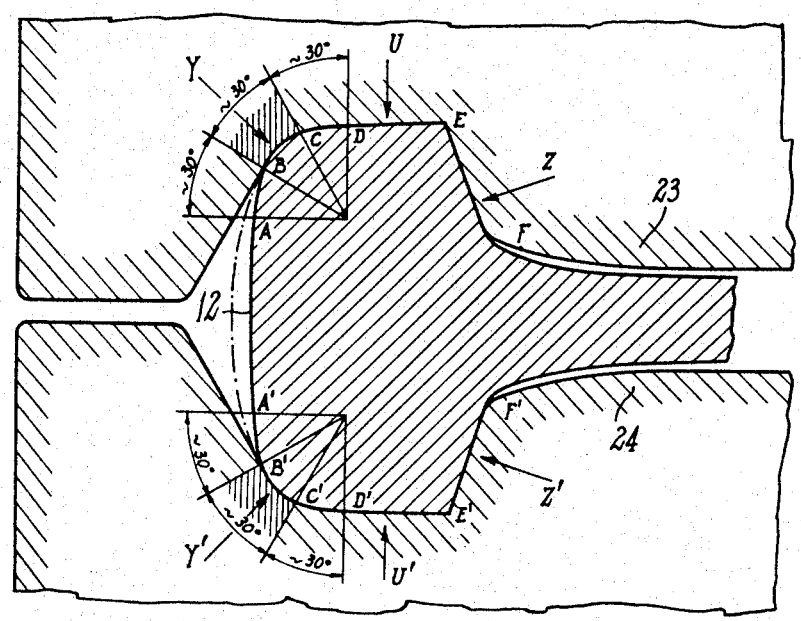

In each rolling pass of the second series, see FIG. 4, which alternate with the passes of the first series, the section is subjected to a different set of symmetrical rolling forces applied predominantly to the side surfaces of the rail head, as indicated at $UU'$, as well as to the upper side edge surfaces (as at $YY'$) and to the base surfaces (as at $ZZ'$), while permitting limited expansion of the metal from the top of the rail head as indicated by the dot-dash line in FIG. 4.

It is indicated at this point that throughout the specification and claims, expressions such as "top," "base" or "bottom," and terms of similar meaning, are to be interpreted as applying to the rail section as it is positioned in service, on a railroad track.

According to the invention, the rail section may be submitted to any suitable number of passes of the first series (as in FIG. 3) interspersed with a corresponding number of passes of the second series (as in FIG. 4), say three four of five passes of each kind.

Hereinafter, for convenience, the passes of the type shown in FIG. 3 will sometimes be designated as "top-rolling passes," and the passes of the type shown in FIG. 4 as "side-rolling passes."

During each top rolling pass, rolling pressure is preferably applied also to the sides of the rail web as indicated at $T,T'$, FIG. 3, while during the side rolling passes the rail web side surfaces are desirably left free of pressure forces, as shown in FIG. 4. This is desirable both in order to reduce the drive requirements during the side-rolling passes and to control more closely the amount of extrusion occurring from the top of the rail head.

FIGS. 3 and 4 also indicate in cross sectional contour parts of the rolls between which the section is rolled in each type of pass in order to subject it to the systems of rolling forces above described. As shown (FIG. 3), for a top-rolling pass there is used a minimum of three rolls, as shown at 20, 21 and 22. Roll 22 is suitably grooved to conform with the upper portion of the rail head, including the generally flat or slightly convex uppermost tread surface $AA'$, followed on each side symmetrically, by the downwardly tapering marginal surfaces $AB$ and $A'B'$, then the rounded side edge surface portions $BC$ and $B'C'$. Beyond the points $C$ and $C'$ the contour of roll 22 is made to diverge away from the sides or flanks of the rail head. The two side rolls 20 and 21 used in this top-rolling pass, are symmetrically shaped in order to conform with the tapered base surfaces of the rail head as indicated at $EF$ and $E'F'$ and then continuously with the sides of the web of the rail section.

Thus, the set of three rolls 20, 21, 22 is seen to apply the downward forces $XX'$ to the top or tread surface $BAA'B'$ of the rail head as well as the downward-inward forces $YY'$ to the rounded upper side edge surfaces $BC$ and $B'C'$, the upward-inward forces $ZZ'$ to the base surfaces $EF$ and $E'F'$, and the inward surfaces $TT'$ to the web side surfaces. The resultant of these simultaneously-applied, opposing forces is a pair of residual outwardly directed forces which tend to extrude the metal laterally outward in the relatively unconstrained side areas $CE$ and $C'E'$ of the rail head, thereby causing a limited expansion or enlargement of the blank as indicated by the dot-dash lines in these areas.

During the side-roll passes (FIG. 4), there are used a pair of rolls 23 and 24 which are suitably profiled, as shown, to conform with the rail section in the rounded upper side edge areas $BC$ and $B'C'$, there to exert the forces $Y$ and $Y'$, then extend along the sides $CE$ and $C'E'$ to exert the inward forces $U$ and $U'$, and along the base areas $EF$ and $E'F'$ to develop the upward forces $Z$ and $Z'$. The resultant of these forces is a residual upward force which extrudes the metal through the relatively free upper region between $B$ and $B'$, to cause an upward expansion or enlargement of the rail section as indicated by the dot-dash line.

It will thus be realized that each of the enlargements of the rail section through extrusion into the free areas provided for in each pass, as indicated by the dot-dash lines in FIGS. 3 and 4, is cancelled during the next pass, and since the process embodies a number of passes of each kind, these enlargements are made to become smaller and smaller throughout the rolling process, and the rail blank is gradually shaped to its final contour in a smooth and progressive manner. During the top-rolling passes the tread surface of the rail and more especially the side edge regions $BC$, $B'C'$, is exposed to intense cold working, imparting high strength to this part of the rail which in service is exposed to the heaviest loads stresses. The same is true of the sides of the rail head during the side-rolling passes. Throughout all the passes, shaping pressure is applied to the rounded upper edge surface as at $BC$ and $B'C'$ thus preserving the contour thereof in addition to increasing the cold-work action. It will be noted that the process preserves full symmetry in the rolling forces applied to the rail section throughout.

As regards the base of the rail section, not shown in FIGS. 3 and 4, the precise manner in which this is shaped during the process is of relatively minor importance. Preferably this is done as will presently be described.

Figures 5, 6:
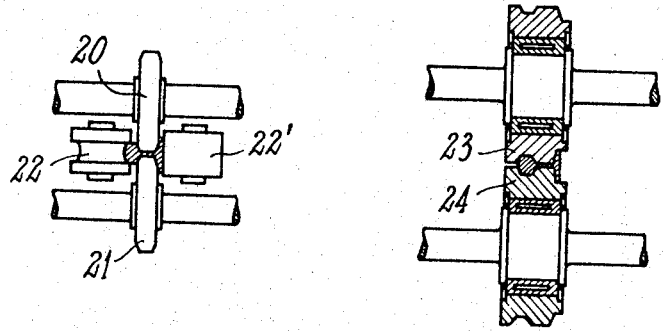
FIG. 5 is a small scale partial view in cross section of a universal, four-roll, rolling stand used in carrying out one of the two alternating types of rolling passes of the invention.
FIG. 6 is a similar view of a two-high rolling stand used in performing the other of the two alternating types of rolling passes of the invention.

A suitable rolling mill usable according to the invention for performing the top-rolling passes of the process is partly illustrated in FIG. 5. This is a four-roll universal mill which includes the three rolls 20, 21 and 22, already referred to in connection with FIG. 3, and a fourth roll 22' which may have a flat surface for producing the flat under surface of the rail base.

A suitable rolling mill usable for performing the side-rolling passes of the process of the invention is partly illustrated in FIG. 6 This is a two-high stand including the two profiled rolls 23 and 24 referred to in connection with FIG. 4.

Reference will now be made to FIG. 21 which schematically illustrates a rolling plant lay-out for performing the process of the invention in a continuous manner. This lay-out is shown as including an initial blanking mill 28 which may be a reversible three-high stand 28 powered by a suitable reversible motor 29 and gearbox 30. The work may be passed four times through mill 28 as shown, and the initially shaped blank is then passed to a blank finishing mill 31. This may be a two-high stand of the kind shown to a larger scale in FIG. 22 as including the two rolls 32 and 33, appropriately grooved, and driven from a motor 30' by way of the gearbox 29'. From the blank finishing stage 31, the finished blank, of the symmetrical shape shown at *b'* in FIG. 2, is passed to the continuous chain of rolling mills in which it is to be subjected to the alternate series of top-rolling and side-rolling passes in accordance with the invention. This chain is shown as including the three four-roll universal stands 32, each of which may be similar to the stand already referred to in connection with FIGS. 3 and 5, and interspersed with the universal stand 32, the two-high profiled-roll stands designated 33, each of which may be similar to the stand discussed with reference to FIGS. 4 and 6.

It will be noted that in this embodiment each of the universal stands 32 in which the top-rolling passes are made is driven from a related motor 32' (e.g. non-reversing/variable-speed D-C motors) through a gearbox 32'', whereas the two-high profiled-roll mills 33 for the side-roll passes are desirably idle, being driven by the tension of the work. The progress of the rolling process through the chain of rolling mills 32 and 33 of FIG. 21 may be followed by referring to FIGS. 7–12. In each figure, the approximate contour of the work section as it is delivered to the corresponding-stage mill, is indicated in dot-dash lines. It will be understood that the sequence of passes is the sequence shown by FIGS. 7 through 12 taken in that order, FIGS. 7, 9 and 11 indicating the top-rolling passes and FIGS. 8–12 the side-rolling passes.

The work as resulting from the last side-rolling pass in the last two-high stand 33 of the chain shown in FIG. 21, i.e. from the pass indicated in FIG. 12, is passed to a finishing mill 34 (FIG. 21). This may be a four-roll universal stand similar to the stands 32 used in the top-rolling passes. As shown in FIG. 13, during this finishing pass the rail head, web and base are rolled to their precise final dimensions between the three rolls 25, 26 and 27, which are accurately contoured. A so-called Gary type mill may conveniently be used as the finishing mill. Desirably, the finishing mill is a dual, revolving turret-mounted mill as shown in FIGS. 23 and 24. As shown the mill includes the main horizontal rolls 35 and 36 which are formed with two pairs of complementary grooves, only one pair being actively used at a time, and the two pairs being symmetrically related on opposite sides of the central transverse plane of the rolls. Three are provided the two smooth vertical rolls 37 and 38 which cooperate with the respective pairs of grooves in rolling the work to the final shape. As shown in FIGS. 23 and 24, the right-hand pair of grooves (FIG. 23) associated with vertical roll 37 is being used to roll a rail section while the opposite vertical roll 38 serves as a backing roll. When one pair of grooves has sustained wear exceeding prescribed tolerances, the entire stand is rotated 180° by way of its turret about a vertical axis, and the alternative pair of grooves and vertical roll 38 is used.

In the modified rolling plant according to the invention shown in FIG. 25, a single pair of mills, including a four-roll universal mill 41 and a two-high profiled-roll mill 42, is used to perform all of the main stages of the process of the invention. Referring to FIG. 25, a billet is again passed through an initial blanking mill 39, such as a reversible three-high stand in which it is submitted to a number of, e.g. five, passes, and thence through the blank finishing mill 40 such as a two-high stand. The blank, of a shape similar to that shown at *b'* in FIG. 2, is then passed to the four-roll universal mill 41, which may be similar to the four-roll mills previously discussed with reference to FIGS. 3 and 5, and is driven from a reversible motor 42' through gearing 41'. From the universal mill 41 the work is immediately passed through the two-high profiled-roll stand 42 which may be similar to the one shown in FIGS. 4 and 6, and which is not driven otherwise than by the tension of the work. In the pair of reversible roll mills 41 and 42 the work is subjected to a number of passes through each mill, i.e. the five passes schematically indicated in FIG. 25, namely five top-rolling passes in mill 41 respectively followed by five side-rolling passes in mill 42. After the fifth side-rolling pass the work is passed through the finishing mill 43, which may be of the simple three-roll type illustrated in FIG. 28, and may constitute a two-high stand including the two rolls 23 and 24 plus the smooth vertical roll 43'. In this finishing mill the accurate final dimensions are imparted to the rail section.

Broadly speaking, the top- and side-rolling passes repeatedly performed through the single pair of rolling mills 41, 42 in the reversible rolling plant of FIG. 25 may be similar to the top- and side-rolling passes effected in the successive mills 32, 33, . . . of the continuous installation of FIG. 21. Preferably however, the reduction in section and consequently the rolling pressure in each pass, is made somewhat lower in the respective process (FIG. 25) than in the continuous process (FIG. 21). The reason is the following. During the rolling passes, especially the side-rolling passes in the process of the invention, the metal in the head portion of the rail blank section is subjected to substantially greater pressure and hence greater longitudinal elongation than is the metal in the flat base portion of the section. This tends to bend or camber the rail along its length with the base becoming concave and the head convex. The degree of camber is, of course, proportionate with the degree of section reduction and hence the rolling pressure used. In the repetitive process of FIG. 25, it is important that the bend thus imparted to the work after each side-rolling pass through mill 22 is kept within acceptable limits. This requires that the rolling pressure used in each pass be made somewhat less than what can be satisfactorily used in the continuous process of FIG. 21, say by an amount of about 30%. The number of passes must then of course be correspondingly increased, and it is for this reason that five top-rolling passes and five side-rolling passes have been indicated as used in FIG. 25 as against only three passes of each kind in the continuous process of FIG. 21.

In the repetitive process of FIG. 25, considering the top-rolling passes performed in the universal mill 41, it is important also to modify the axial spacing between the vertical rolls (such as 22, 22', FIG. 5) between consecutive reverse passes, in such a way as to ensure substantially equal rates of section reduction, and hence longitudinal elongation, both in the head portions and the base portions of the rail section. This involves displacing the head roll (22) to the right (as seen in FIG. 5) a distance suitably greater than the base roll (22') is displaced to the left, by the amount necessary to cause substantially equal section reductions and longitudinal elongations in the head and base parts of the rail, and avoid an appreciable degree of longitudinal bending which would interfere with the correct guidance of the work into the two-high mill stand for the next side-rolling pass. Consequently, the universal mills used in the repetitive process of FIG. 25 should include provision for such adjustment of the independent transverse position of each of the vertical rolls therein. Conventional universal mills as used in the production of parallel-flanged rolled sections can be conveniently applied for this purpose.

FIGS. 14 to 20 illustrate a typical sequence of cross-section reducing steps that may be used in a process according to the invention of the repetitive type shown in FIG. 25. In these views, only three passes of each kind have been shown out of the five actually used as indicated above. Thus FIGS. 14 and 15 show the first top- and side-rolling passes respectively; FIGS. 16 and 17 the third top- and side-rolling passes; and FIGS. 18 and 19 the fifth top- and side-rolling passes. FIG. 20 shows the final pass through finishing mill 42.

It will be apparent from the above disclosure that the method of the invention accomplishes the various objects set forth. The head portion of the rail and especially the side edges thereof is considerably strengthened owing to the intense cold-working forces directly applied to them in all passes. The work remains fully symmetrical in cross section throughout the rolling process from the initial blank to the finished rail, and substantially balanced forces are applied to it in each pass. Sharp edges and projections are averted. All this improves the continuity of the fibrous crystal structure in the metal, as well as resulting in a more uniform cooling of the various parts of the rail section.

For the above reasons, internal tensions in the finished rail are greatly reduced as compared to what is found to occur in rail stock made by conventional rolling processes, and the strength and service life of the resulting rail, ceteris paribus, are substantially increased.

It will be evident that various departures may be made from the specific steps of procedure and details of apparatus described and illustrated herein while retaining the essential teachings of the invention.

What I claim is:

1. The method of producing a rail comprising the steps of: producing a rail blank having a symmetrically shaped section; subjecting the blank to a first series of rolling passes and to a second series of rolling passes alternating with said first series; applying to said blank in each pass of said first series a set of symmetrical rolling forces predominantly in the portions of said section that are to provide the upper surface, upper side edge surfaces and under surfaces of the rail head in the finished rail, while permitting limited extrusion of the section laterally of the rail head, and applying to said blank in each pass of said second series a set of symmetrical rolling forces predominantly in the portions of said section that are to provide the side surfaces, upper side edge surfaces and under surfaces of the rail head in the finished rail, while permitting limited extrusion of the section from the top of the rail head.

2. The method of claim 1, including the further step of applying to said blank in each pass of said first series symmetrical rolling forces to those opposite surface portions of said section that are to provide the side surfaces of the rail web, while omitting said last mentioned forces in the second series passes.

3. The method of poducing a rail comprising the steps of: producing a rail blank having a symmetrically shaped section including a head, web and base portions; subjecting the blank to a first and a second series of rolling passes in alternating relationship, including:

applying to said blank in each pass of one of said series a set of symmetrical forces in an upper region, upper side edge regions and base regions of said rail head portion, opposite side regions of said web portion and top and bottom surface regions of said base portion while, permitting limited extrusion of the section laterally of the rail head portion;

applying to said blank in each pass of the other series a set of symmetrical forces in the opposite side regions, upper side edge regions and base regions of the rail head portion while, permitting limited extrusion of the section from the top of the rail head portion; and so correlating the degrees of section reduction in the consecutive passes of the respective series that the limited extrusion produced in a pass of one series will be substantially cancelled by the limited extrusion produced in a following pass of the other series.

4. The method specified in claim 3, including the further step of subjecting the blank to a finishing pass in which rolling forces are applied symmetrically to all surfaces of the blank to bring the rail section to accurate final dimensions.

5. The method of producing a rail comprising the steps of:

producing a rail blank having a symmetrically shaped section including a head, web and base portions;

passing the blank a number of times between four rolls of a universal mill and a number of times between two rolls of a profiled-roll mill in generally alternating sequence;

applying to said blank in each said pass through the universal mill a set of symmetrical forces in an upper region, upper side edge regions and base regions of said rail head portion, side regions of said web portion and top and bottom regions of said base portion while permitting limited expansion of the blank laterally of the head portion;

applying to said blank in each said pass through a profiled-roll mill a set of symmetrical forces in upper side edge regions, side regions and base regions of said rail head portion while permitting limited expansion of the blank from the top of the head portion;

so correlating the ratios of section reduction in consecutive passes through said universal mill and said profiled-roll mill that the limited expansion produced in a pass through one of said mills substantially cancelled by the limited expansion produced in a following pass through the other mill; and passing the blank through a finishing mill and applying therein rolling forces symmetrically to all surfaces of the blank to bring the rail section to accurate final dimensions.

6. The method of claim 5, including the steps of power-driving said universal mills and allowing said profiled-roll mills to be idly driven by said blank.

7. The method of claim 5, wherein the work is passed continuously through a plurality of said universal and profiled-roll mills to be subjected to a corresponding pass in each mill.

8. The method of claim 5, wherein the work is passed repeatedly through a common universal mill and a common profiled-roll mill, and including the step of readjusting said mills at each pass.

9. The method of claim 5, wherein said mills are reversible.

10. The method of claim 8, including the steps of so readjusting said universal mill at each pass that substantially equal longitudinal elongations are imparted to said head and base portions of the blank during the pass whereby to minimize longitudinal bending of the work.

References Cited

UNITED STATES PATENTS

| 657,964 | 9/1900 | Seaman | 72—225 |
|---|---|---|---|
| 1,201,239 | 10/1916 | Becker | 72—225 |

CHARLES W. LANHAM, *Primary Examiner.*

H. D. HOINKES, *Assistant Examiner.*